(12) United States Patent
Mutz et al.

(10) Patent No.: US 12,372,424 B2
(45) Date of Patent: Jul. 29, 2025

(54) TORQUE MEASUREMENT AT A DISK

(71) Applicant: NCTE AG, Oberhaching (DE)

(72) Inventors: Robert Mutz, Grünwald (DE); Florian Eckschlager, Riemerling (DE); Bernhard Mayr, Munich (DE)

(73) Assignee: NCTE AG, Oberhaching (DE)

( * ) Notice: Subject to any disclaimer, the term of this patent is extended or adjusted under 35 U.S.C. 154(b) by 452 days.

(21) Appl. No.: 17/857,685

(22) Filed: Jul. 5, 2022

(65) Prior Publication Data

US 2023/0003592 A1   Jan. 5, 2023

(30) Foreign Application Priority Data

Jul. 5, 2021   (EP) ..................................... 21183622

(51) Int. Cl.
G01L 3/10   (2006.01)

(52) U.S. Cl.
CPC ..................... G01L 3/102 (2013.01)

(58) Field of Classification Search
CPC ........ G01L 3/102; G01L 3/1435; B25J 19/02; B62J 45/411
See application file for complete search history.

(56) References Cited

U.S. PATENT DOCUMENTS

| | | | | |
|---|---|---|---|---|
| 8,424,393 B1* | 4/2013 | Lee | ........................... | G01L 3/10 73/862.331 |
| 8,635,917 B2* | 1/2014 | Lee | ....................... | G01L 3/1435 73/862.331 |
| 9,046,430 B2* | 6/2015 | Moran | ..................... | G01L 3/102 |
| 10,254,181 B2* | 4/2019 | Ursetta | ..................... | G01L 3/102 |
| 2011/0239815 A1* | 10/2011 | Grab | ........................ | B62M 6/50 324/252 |
| 2013/0232764 A1* | 9/2013 | Lee | ........................... | G01L 3/10 29/428 |
| 2014/0260686 A1 | 9/2014 | Moran et al. | | |
| 2015/0276520 A1* | 10/2015 | Ursetta | ................... | G01L 3/102 73/862.333 |

FOREIGN PATENT DOCUMENTS

| | | |
|---|---|---|
| DE | 102012024264 A1 | 6/2014 |
| EP | 1774271 B1 | 11/2008 |
| EP | 1902287 B1 | 4/2010 |
| EP | 3050790 B1 | 5/2018 |
| EP | 3232172 B1 | 3/2019 |
| EP | 1920221 B1 | 7/2021 |
| JP | 2016027318 A | 2/2016 |

* cited by examiner

*Primary Examiner* — Freddie Kirkland, III
(74) *Attorney, Agent, or Firm* — Young Basile Hanlon & MacFarlane, P.C.

(57) ABSTRACT

A torque sensor includes a disk comprising a magnetostrictive, magnetically biased, or magnetizable material, and a magnetic field sensor assembly. A torque acting about an axis of rotation of the disk can be applied to the disk and the magnetostrictive material is configured to generate a magnetic field outside the disk that changes dependent on the effective torque. The magnetic field sensor assembly is configured to output a signal based on the magnetic field generated by the magnetostrictive material, and the torque sensor is configured to determine a value of the acting torque based on the signal that is output.

12 Claims, 11 Drawing Sheets

TORQUE MEASUREMENT AT A DISK

CROSS-REFERENCE TO RELATED APPLICATION(S)

This application claims priority to and the benefit of European Patent Application Serial No. 21183622.6, filed Jul. 5, 2021, the entire disclosure of which is hereby incorporated by reference.

TECHNICAL FIELD

The invention relates to a torque sensor and a method for producing such a torque sensor.

BACKGROUND

It is often desirable according to prior art to determine the effective torque in a drive in connection with a rotational motion. For example, torques in a bottom bracket (crank bearing) of an e-bike can be determined based on a magnetized shaft of the bottom bracket as the primary sensor and one or more associated magnetic field sensors near the surface of the shaft as the secondary sensor, as described, for example, in EP 3 050 790 B1. Both the primary as well as the secondary sensor are provided within the bottom bracket. The measurement is effected in a contactless manner. Due to the (inverse) magnetostrictive effect, a magnetic field is generated outside the magnetized shaft when a torque is applied and is dependent on the torque currently applied, because the shear and torsional forces acting in the shaft depend thereupon. A measuring circuit comprising the secondary sensor determines the effective torque based on the size of the magnetic field generated.

However, in view of the typically small space available in such bottom brackets, in particular in the context of and electric motor driving in assisted operation and its coupling to the bottom bracket, this solution is structurally very complex or not implemented in a satisfactory manner with regard to the accuracy of the torque measurement.

Another field in which torque is measured with limited space is the field of robotics, as described, for example, in EP 3 232 172 B1. Here as well, the measurement of the torque with magnetized shafts and associated magnetic field sensors in part requires a great structural effort.

SUMMARY

The object underlying the invention is to overcome the drawbacks mentioned at least in part.

This object is satisfied by a torque sensor according to claim 1.

The torque sensor according to the present invention comprises a disk comprising a magnetostrictive, magnetically biased, or magnetizable material; and a magnetic field sensor assembly; where a torque acting about an axis of rotation of the disk can be applied to the disk and the magnetostrictive material is configured to generate a magnetic field outside the disk that changes depending on the acting torque; where the magnetic field sensor assembly is configured to output a signal based on the magnetic field generated by the magnetostrictive material; and where the torque sensor is configured to determine a value of the acting torque based on the signal that is output.

According to the invention, a disk, which acts as an element transmitting forces, is used to measure the torque applied in that the disk is magnetically biased (i.e., in particular before it is installed in a drive). In this way, the disk and not a shaft on which the disk can be arranged is used as the primary sensor.

This has the structural advantage that the magnetic field sensor assembly (and any associated electronics that may be necessary) does not have to be arranged on the shaft but can be provided outside of the drive (for example, bottom bracket). Due to the reason that the surface of the magnetized component can then be effectively rotated by 90°, other spatial options for providing the magnetic field sensor assembly arise.

In the alternative in which the disk comprises a magnetically biased material, permanent magnetization of magnetostrictive material of the disk is given.

In the alternative, in which the disk comprises a magnetizable material, a magnetization assembly can furthermore be provided for magnetizing the magnetostrictive magnetizable material over a limited period of time so that the magnetic field, which changes depending on the acting torque, can be generated outside of the disk with the magnetostrictive and thus magnetized material. This therefore provides active magnetization when torque sensing, the material need not be magnetically biased.

The disk is rotatable about an axis of rotation. The magnetic field sensor assembly can be arranged to be co-rotatable synchronously with the disk, in particular can be connected thereto in a rotationally fixedly manner. This further development has the advantage that the magnetic field sensors co-rotate with the magnetization and can directly detect changes due to a change in torque. This is particularly advantageous in the case of radially magnetized connection regions between an inner and an outer region of the disk, because the shearing forces and the resulting magnetic fields arise in the connection region(s). Alternatively or additionally, the magnetization assembly can be arranged to be co-rotatable synchronously with the disk, in particular can be connected thereto in a rotationally fixed manner.

As an alternative thereto, the magnetic field sensor assembly can be arranged to be independent of a rotation of the rotatable disk. This is particularly suitable for solid disks whose shearing forces (and therefore also the magnetic fields generated) do depend on the radial distance from the axis of rotation, but are substantially constant with a constant radius in the direction of rotation. Alternatively or additionally, the magnetization assembly can be arranged to be independent of a rotation of the rotatable disk.

In another further development, the magnetic field sensor assembly can comprise at least one electric coil and/or at least one AMR sensor. In particular, one or more electrical (measuring) coils or one or more AMR sensors in electronic measuring equipment are suitable for detecting the magnetic field or its change, respectively. AMR sensors are based on the anisotropic magnetoresistive effect.

The inner region, the outer region, and the at least one connection region can be formed integrally. The disk can therefore be produced as a blank, for example, from a solid disk made of metal. This blank can be given its final shape by machining steps such as drilling.

The at least one connection region can comprise connection elements and/or spokes and/or struts. In the event that the inner region, the outer region, and the at least one connection region are formed integrally, free spaces (recesses in the solid disk) are provided between the connection elements and/or the spokes and/or the struts.

A driving force can be applied at the inner region, whereby the inner region acts as a driving region and the outer region acts as a driven region. Alternatively, a driving force can be applied at the outer region, whereby the outer region acts as the driving region and the inner region to act as the driven region.

In this case, the inner region can comprise a first coupling device for coupling to a drive element and the outer region can comprise a second coupling device for coupling to a driven element; or the inner region can comprise first a coupling device for coupling to a driven element and the outer region can comprise a second coupling device for coupling to a drive element.

A drive bearing, in particular a bottom bracket, according to the present invention comprises a torque sensor according to the invention, where a chainring carrier or crank star of the drive bearing is formed as the disk of the torque sensor. The magnetic field sensor assembly can be provided in relation to a bottom bracket casing on an inner side or an outer side of the disk.

A device with such a drive bearing can be an ergometer, an e-bike, a bicycle or a motorcycle A robotic device according to the present invention comprises a torque sensor according to the invention.

The invention further provides a method with which a disk for use in a torque sensor according to the invention can be magnetized. In particular, the disk can be a part of a drive device that is needed anyhow. Magnetization can give the disk an additional function in a torque sensor.

The method for magnetizing a disk comprising a magnetostrictive material comprises at least the following steps: conducting an electrical current from a connection region, provided between an inner region which with respect to an axis of rotation is in proximity to the axis and an outer region of the disk which is remote from the axis, to the inner region and/or the outer region; and/or conducting an electrical current from a first side of the disk to an axially opposite second side of the disk. However, the current can also be conducted from the inner region via the connection region to the outer region, or alternatively in the opposite direction.

In this case, the current can be introduced at one or more points of the disk, and the current can exit at one or more points of the disk.

A further development is that contact points of a power generating device contact the disk from one of the two sides of the disk or where contact points of the power generating device contact the disk in pairs on oppositely disposed sides.

The invention further provides a method for measuring torque. The method comprises the steps of: providing a disk which is rotatable about an axis of rotation and comprises a magnetized magnetostrictive material; applying a torque that acts about the axis of rotation to the disk; generating a magnetic field outside the disk with the magnetostrictive material, where the magnetic field generated varies in dependence of the acting torque; outputting a signal with a magnetic field sensor assembly based on the magnetic field generated; and determining a value of the acting torque based on the signal that is output. In the case of a magnetizable magnetostrictive material, the following further step is performed prior to applying the torque that acts about the axis of rotation to the disk: magnetizing the magnetizable magnetostrictive material for a limited period of time.

The advantages of the method according to the invention correspond to those that were mentioned in relation to the torque sensor according to the invention.

Further features and exemplary embodiments as well as advantages of the present invention shall be illustrated below using the figures. It is understood that the embodiments do not exhaust the scope of the present invention. It is further understood that some or all features described hereafter can also be combined with each other in different ways.

DETAILED DESCRIPTION

Figure 1A:
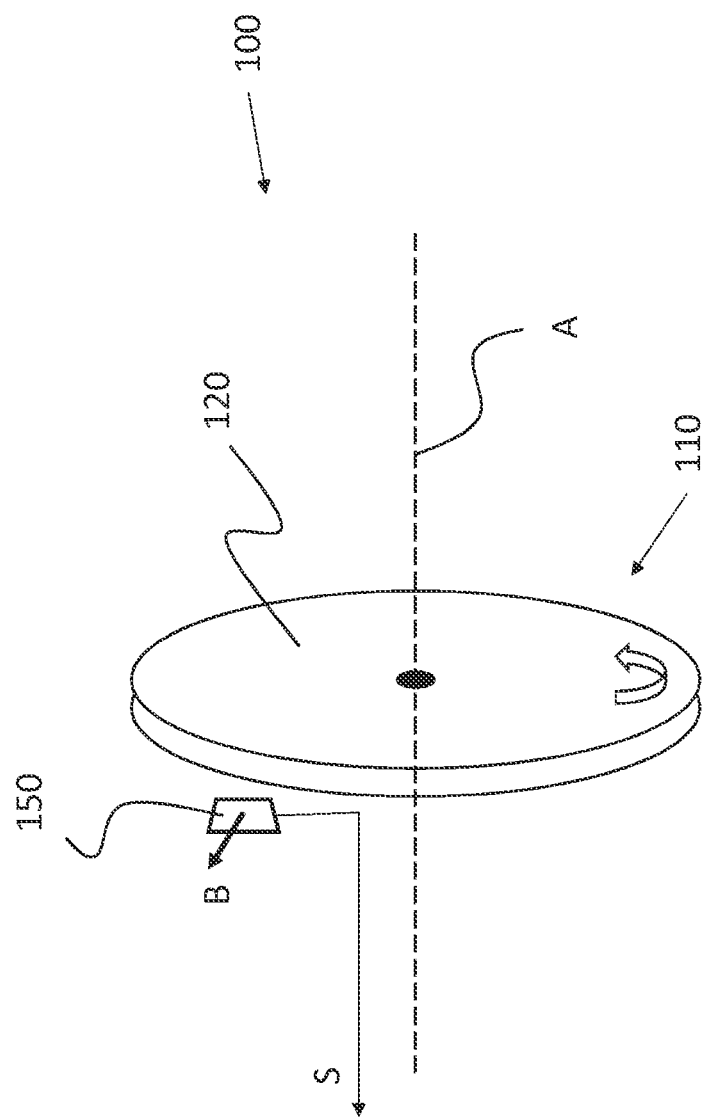
FIGS. 1A and 1B show a first embodiment of the torque sensor according to the invention.
Figure 1B:
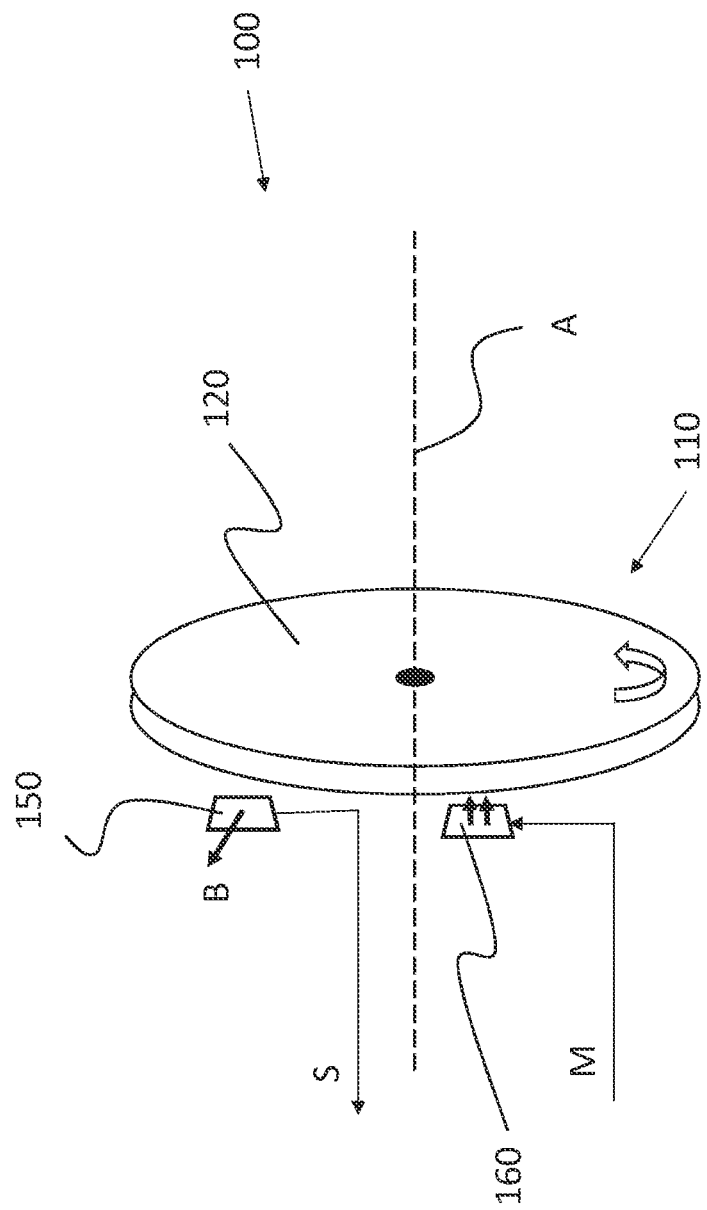

FIGS. 1A and 1B show a first embodiment of the torque sensor according to the invention. FIG. 1A shows a first variant of the first embodiment of the torque sensor according to the invention. FIG. 1B shows a second variant of the first embodiment of the torque sensor according to the invention.

Torque sensor 100 according to the invention comprises a disk 110 comprising a magnetostrictive material 120 and a magnetic field sensor assembly 150. A torque acting about an axis of rotation A of disk 110 can be applied to disk 110 and magnetostrictive material 120 is configured to generate a magnetic field B outside disk 110 that can be changed in dependence of the acting torque; where magnetic field sensor assembly 150 is configured to output a signal S based on the magnetic field B generated. Torque sensor 100 uses output signal S to determine a value of the acting torque, for example, by way of a control or evaluation unit.

In the variant according to FIG. 1A, magnetostrictive material 120 is magnetically biased. An example of magnetostrictive material is iron or iron alloys, steel, etc.

Magnetic field sensor assembly 150 can comprise one or more measuring coils or one or more AMR sensors for detecting magnetic field B. Magnetic field sensor assembly 150 is shown there to be stationary, i.e. it is not intended to be rotatable about axis A together with disk 110. This makes sense if, for a given torque, magnetic field B at the location of magnetic field sensor assembly 150 changes within a rotation about axis A at most in such a way that this is not essential when determining the torque. In certain applications, it can also be possible to average the magnetic field over an entire revolution of the disk.

AMR sensors are advantageous in that magnetic fields can be measured in at least one or more directions; measurements can also be taken, in particular, in the three spatial axes and the magnetic field can be recorded in 3D. One, two, or three components of the magnetic field can be used to determine the torque.

Compared to the variant according to FIG. 1A, a magnetization assembly 160 can additionally be provided in the variant according to FIG. 1B for magnetizing the magnetostrictive magnetizable material over a limited period of time so that magnetic field B, which can be changed as a function of the effective torque, can be generated outside of disk 110 with magnetostrictive and thereby with magnetization assembly 160. A control or evaluation unit can send a respective signal M to magnetization assembly 160 in order to activate magnetization assembly 160 and thereby generate a magnetic field that in turn magnetizes the disk or the magnetostrictive material, respectively. In this case, this is active generation of a magnetic field in the disk during the detection/measurement of the torque. In this case, the magnetization is not permanent, but is only generated for a certain period of time by way of magnetization assembly 160 during a respective measurement of the torque. Such active measurement is also described, for example, in EP 1 920 221 A1/B1.

Figure 2:
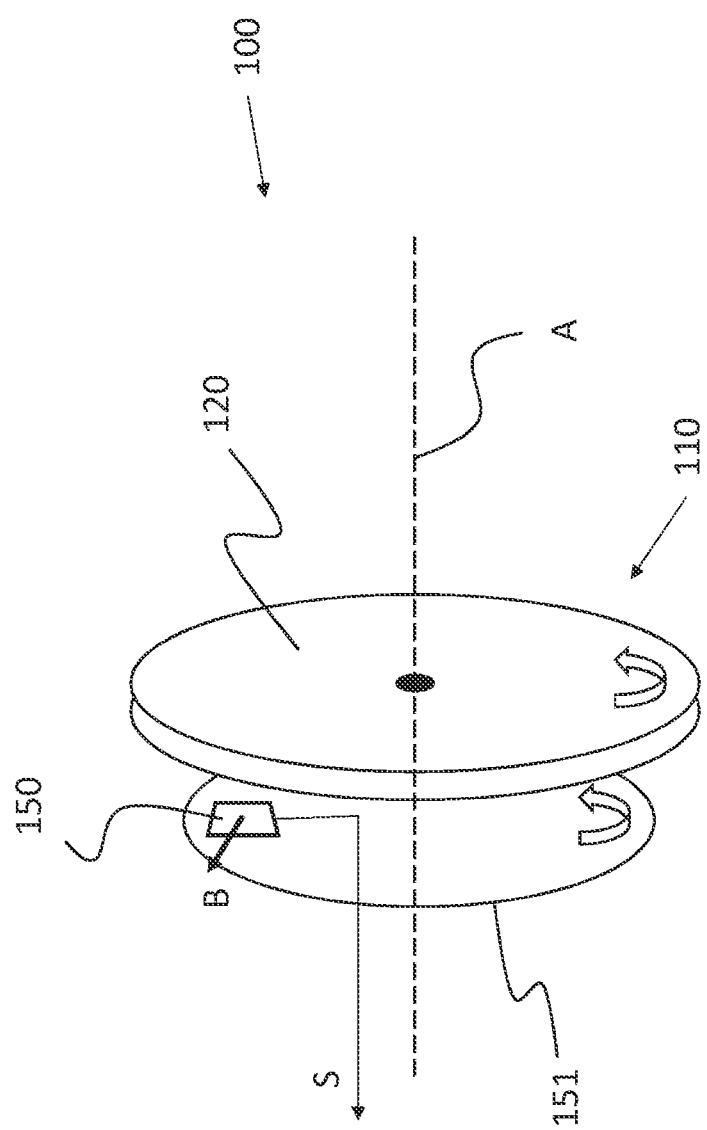
FIG. 2 shows a second embodiment of the torque sensor according to the invention.

FIG. 2 shows a second embodiment of the torque sensor according to the invention.

The only difference from the embodiment according to FIGS. 1A and 1B is that magnetic field sensor assembly 150 co-rotates synchronously with disk 110. For this purpose, magnetic field sensor assembly 150 can be arranged, for example, on a carrier element 151 which in turn is connected in a rotationally fixed manner to disk 110 and therefore co-rotates together with disk 110. As a result, the magnetic field is always detected by magnetic field sensor assembly 150 at the same point on disk 110. With the variant according to FIG. 1B, magnetization assembly 160 can then also co-rotate synchronously. Alternatively, however, magnetization assembly 160 can be stationary, i.e. it does not co-rotate about axis A together with disk 110, but only magnetic field sensor assembly 150 co-rotates synchronously with disk 110.

In this case, signal S can be output, for example, by way of sliding contacts or by way of a contactless wireless connection.

Figure 3A:
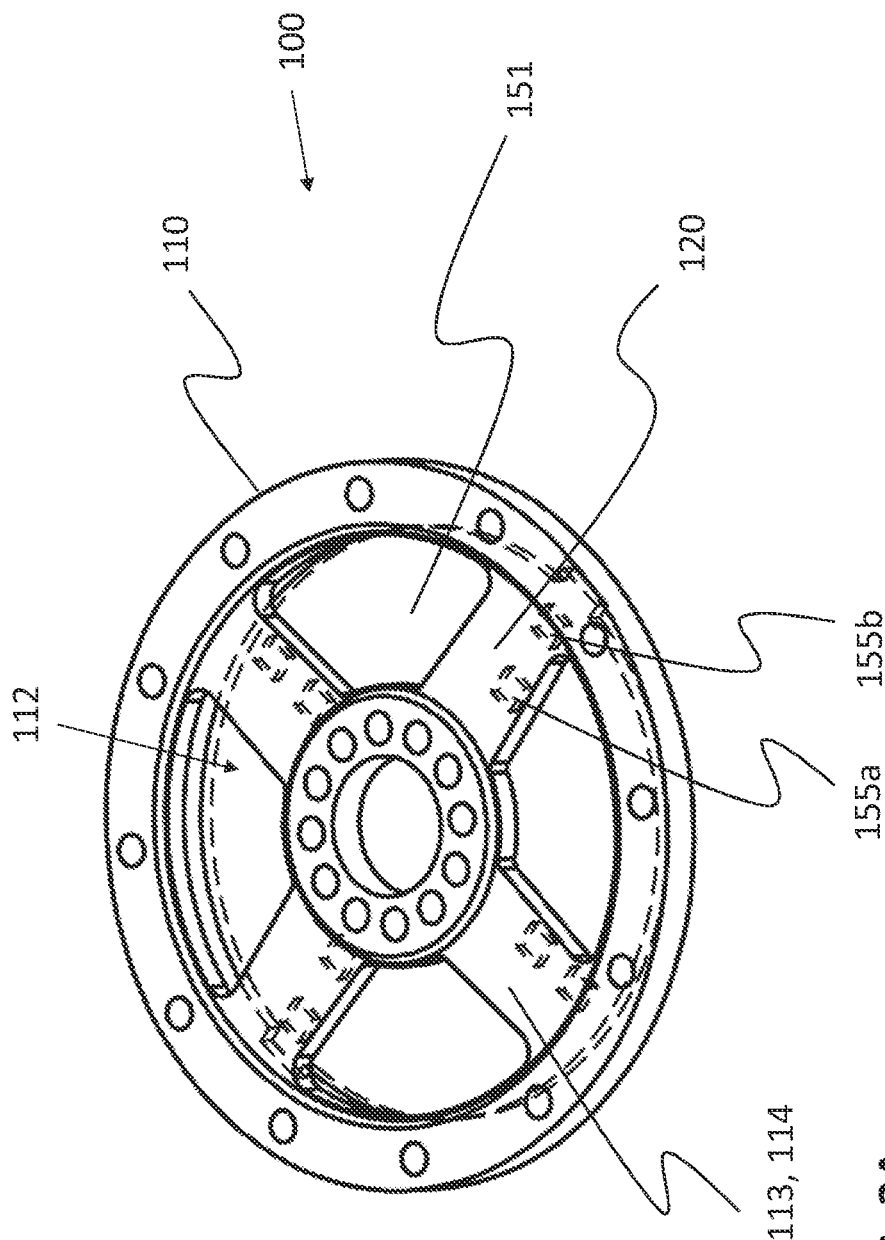
FIGS. 3A-3C show a third embodiment of the torque sensor according to the invention.
Figure 3B:
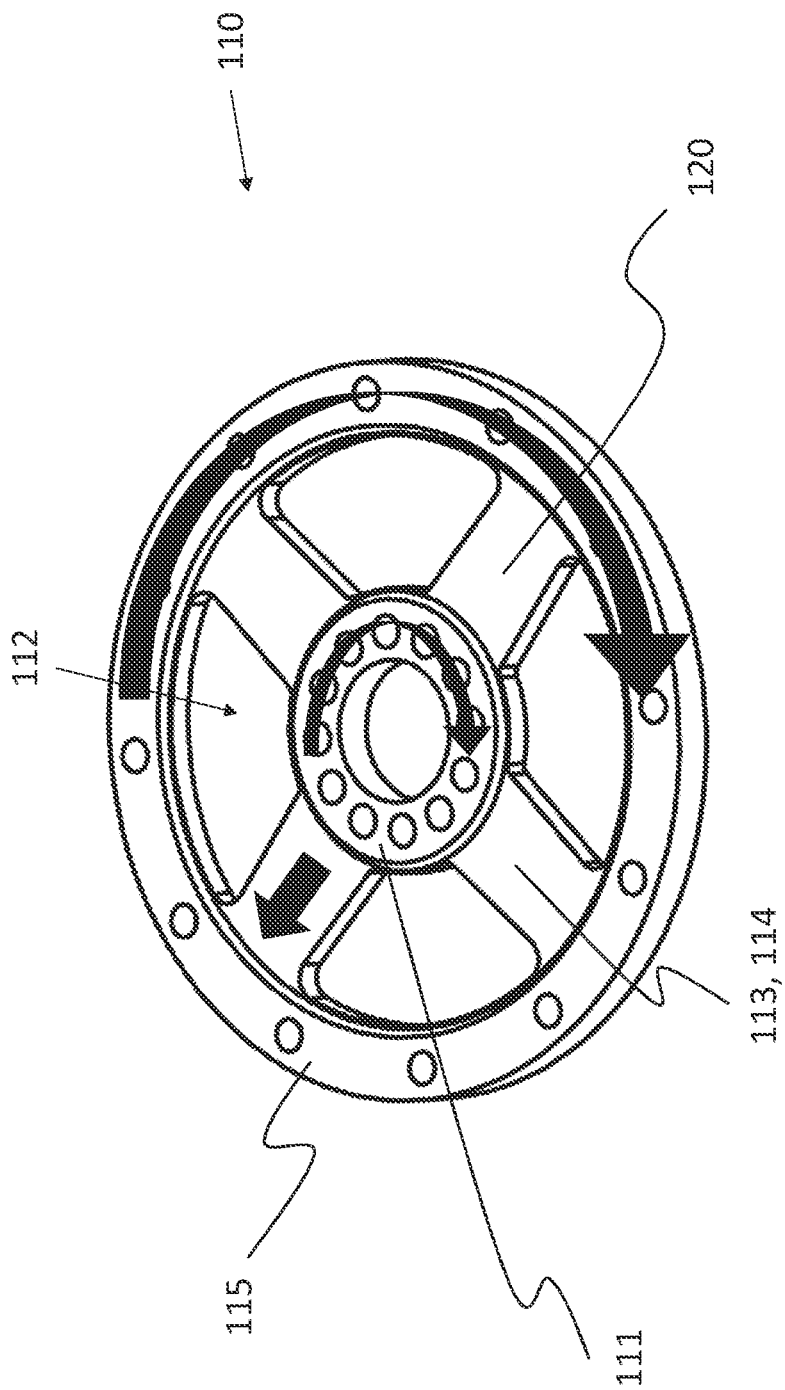
Figure 3C:
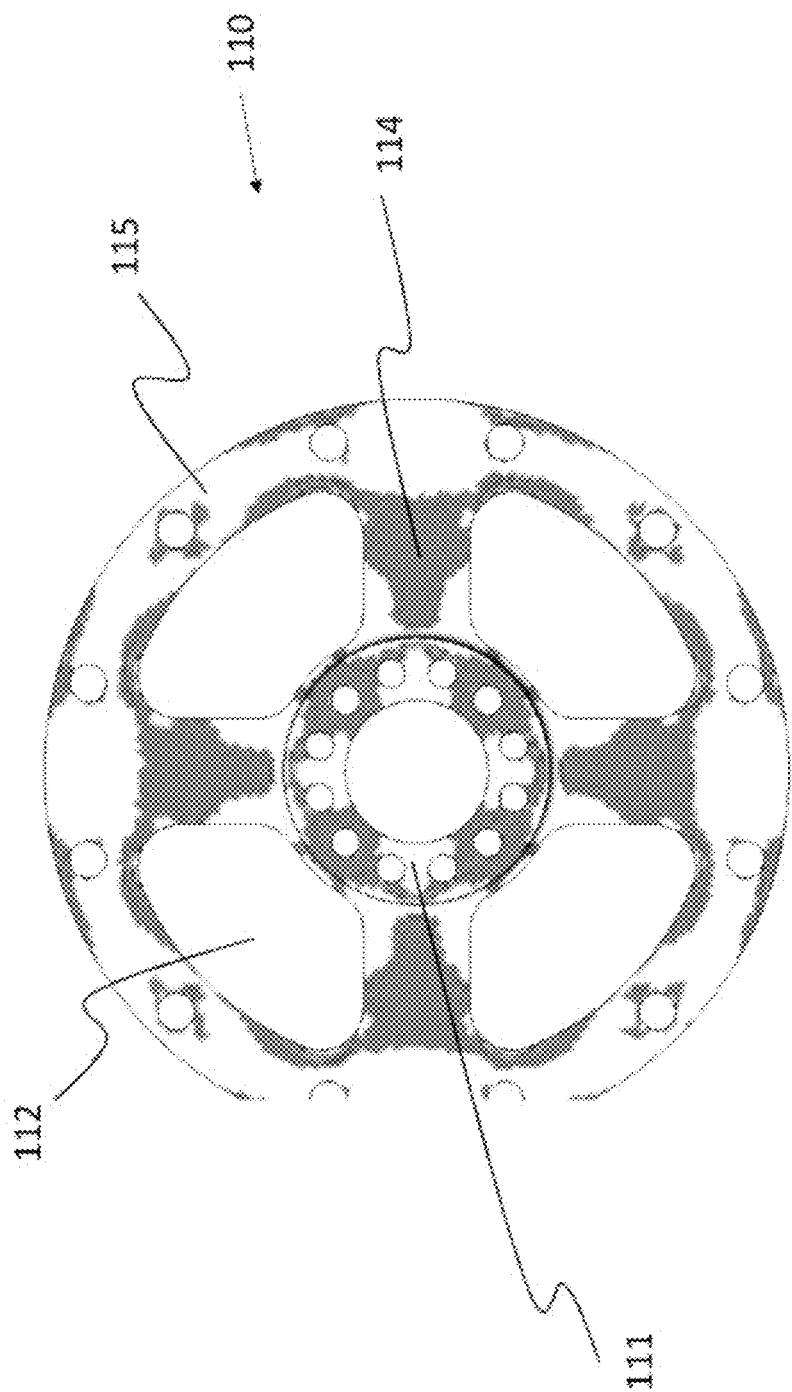

FIGS. 3A-3C show a third embodiment of the torque sensor according to the invention.

It corresponds to the embodiment according to FIG. 2, but where disk 110 is not a homogeneous solid disk but has free regions (openings) 112, where one or more connection elements 114 penetrating radially from the inside outwardly are magnetized (four connection elements in the figure). Connection elements 114 can be regions that remain after the recesses have been introduced into disk 110, or, for example, struts or spokes. In this example according to FIG. 3A, the magnetic field sensor assembly comprises pairs of magnetic field sensors 155a, 155b (four pairs in the figure) which are each associated with a magnetized connection element.

Disk 110 comprises an inner region 111, an outer region 115, and a connection region 113 with connection elements 114 and openings 112.

Both inner region 111 as well as outer region 115 are provided with bores with which a connection to drive or driven elements can be established.

FIG. 3B shows a flow of force from the inside to the outside when inner region 111 is connected to a drive device and the force is transmitted via connection elements 114 to outer region 115 and is there again delivered to a driven component. Disk 110 can be, for example, a chainring carrier of a bottom bracket, where inner region 111 is driven by pedal cranks and the torque is transmitted to outer region 115 and there onward to a chainring attached thereto in order to ultimately exert a force upon a drive chain.

The stresses arising are shown in FIG. 3C according to a simulation. These stresses cause a change in the magnetic field outside the disk due to the inverse magnetostrictive effect and exhibit a high variation in connection elements 114 with the distance from inner region 111.

Figure 4A:
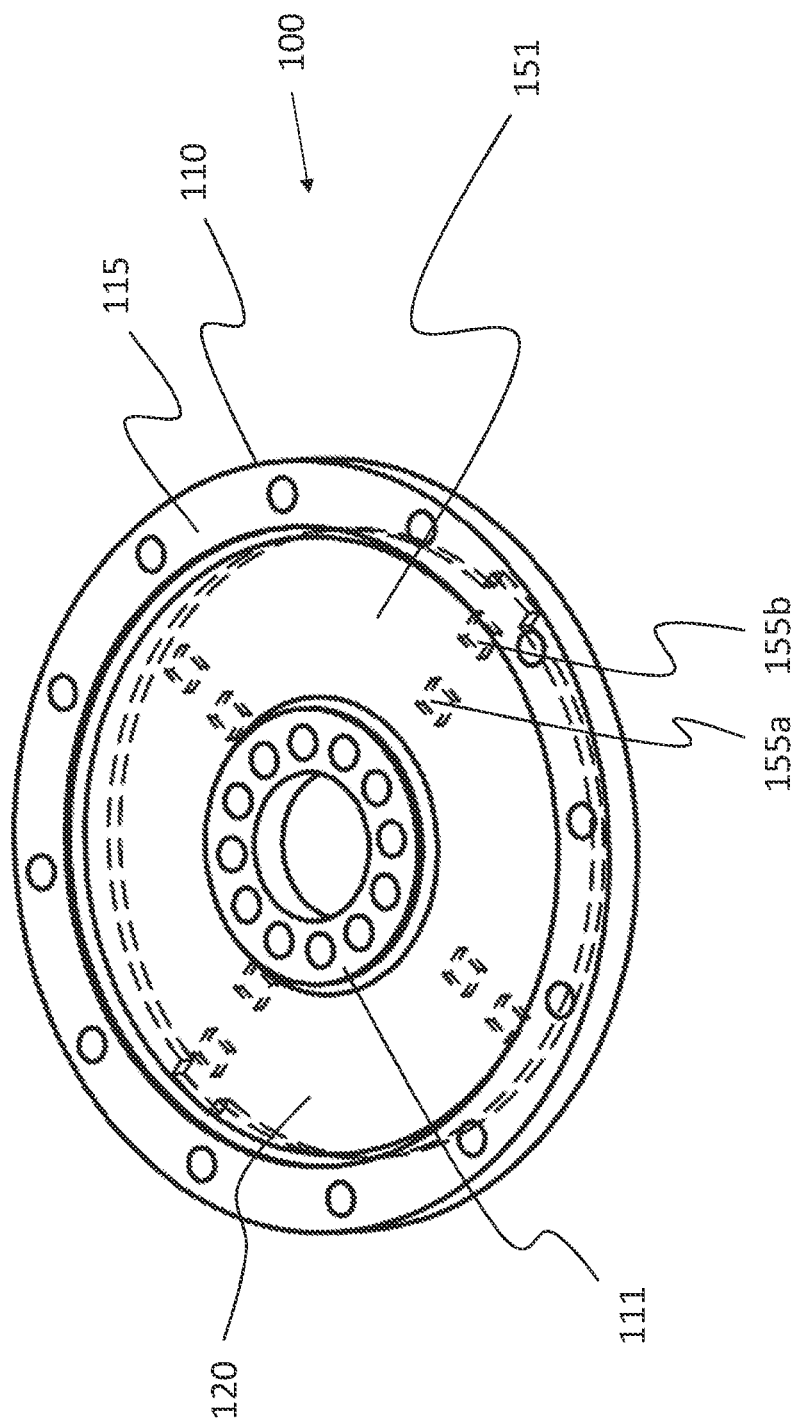
FIGS. 4A-4C show a fourth embodiment of the torque sensor according to the invention.
Figure 4B:
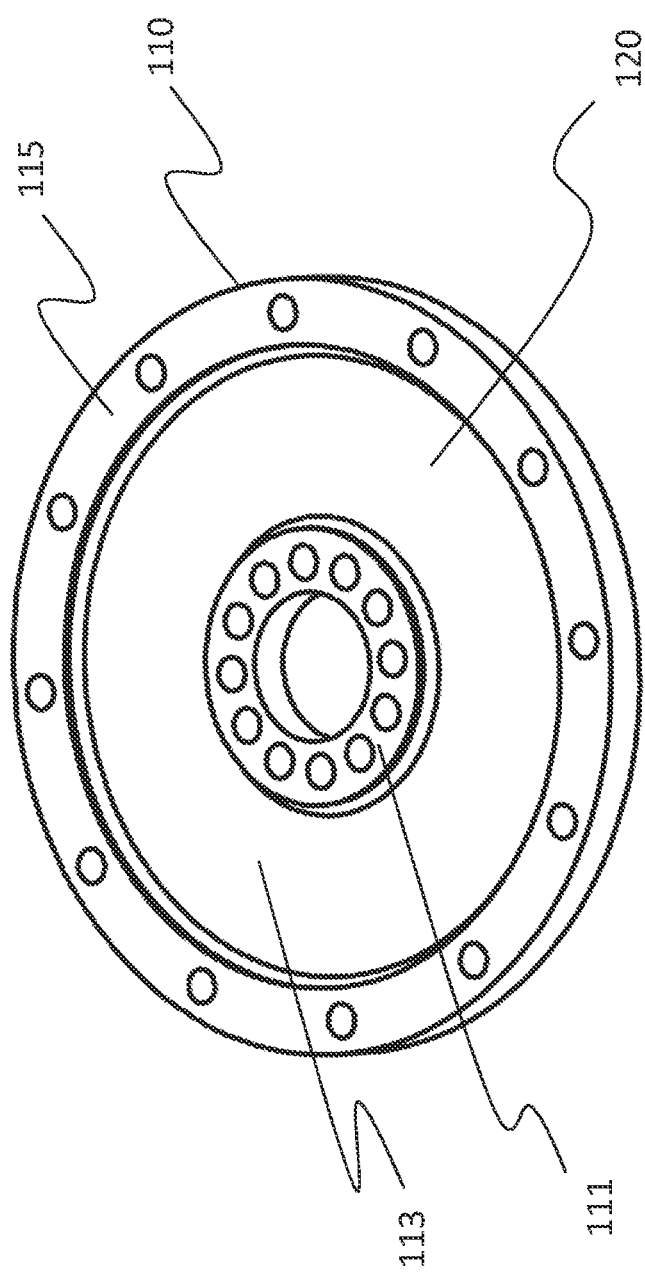
Figure 4C:
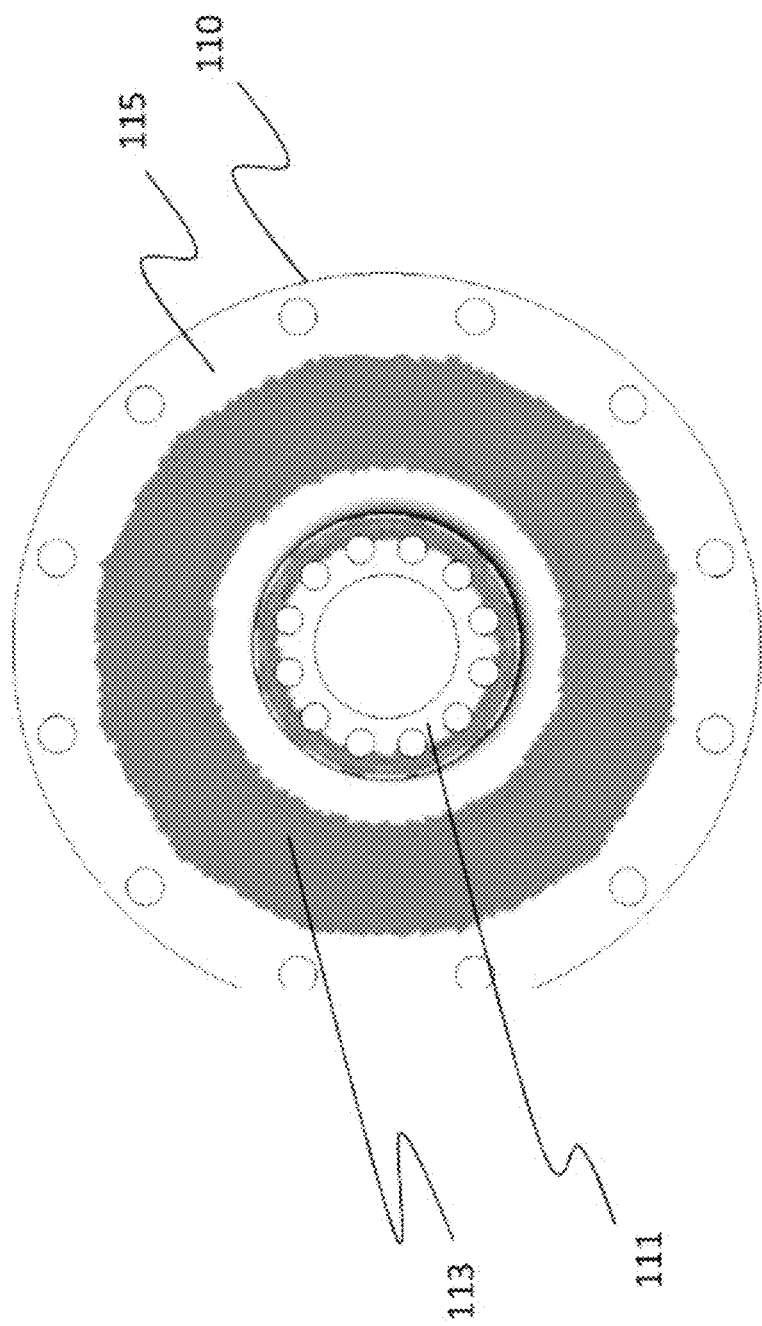

FIGS. 4A-4C show a fourth embodiment of the torque sensor according to the invention.

The embodiment of FIGS. 4A-4C differs from the one according to FIGS. 3A-3C only in that there are no openings present in connection region 113 of disk 110, so it is substantially a solid disk (apart from the bores).

FIG. 4A shows disk 110 together with magnetic field sensor assembly 155a, 155b (secondary sensor). FIG. 4B shows only magnetized disk 110 (primary sensor). FIG. 4C shows the progress of stress according to FIG. 3C.

Figure 5A:
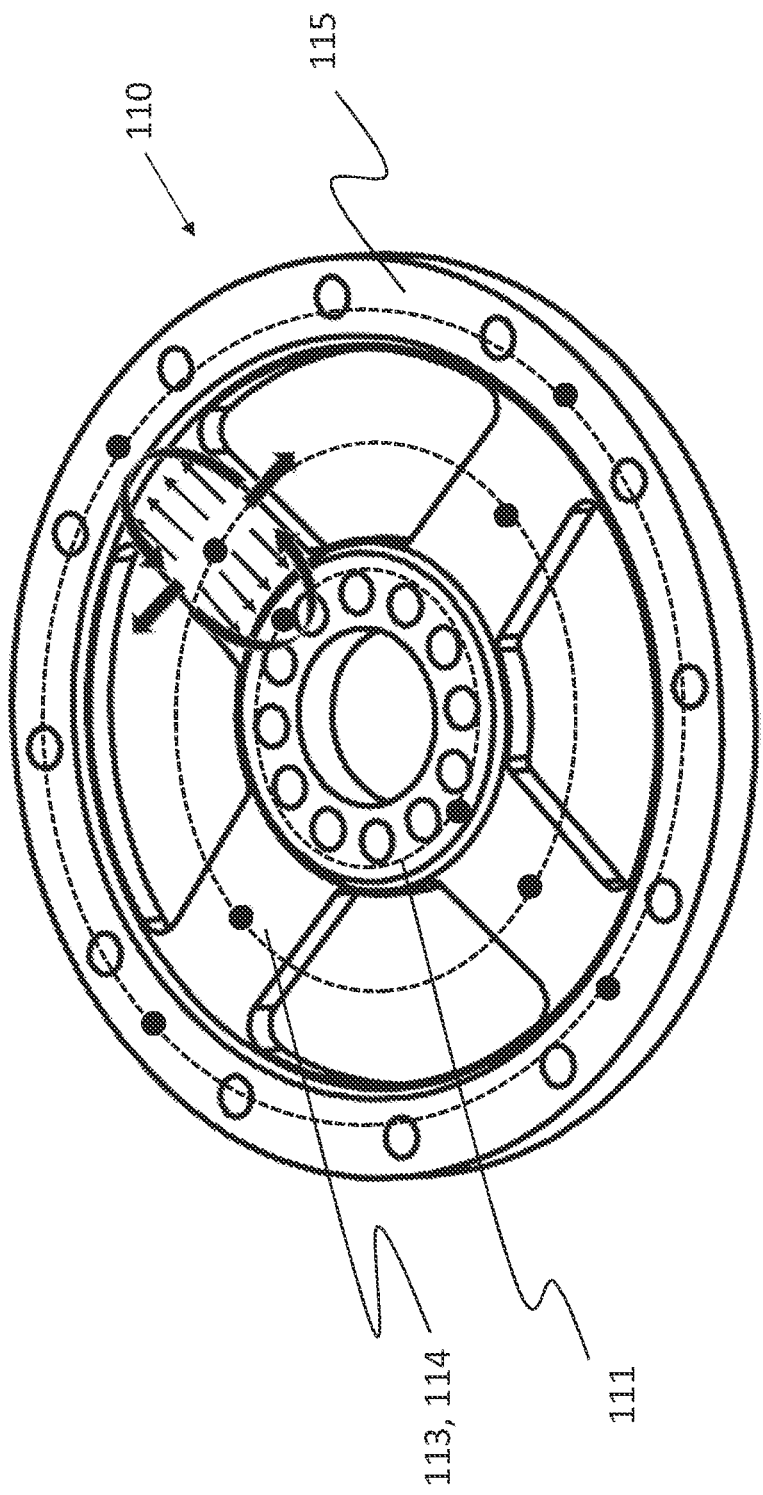
FIGS. 5A and 5B illustrate contacting the disk for magnetization.
Figure 5B:
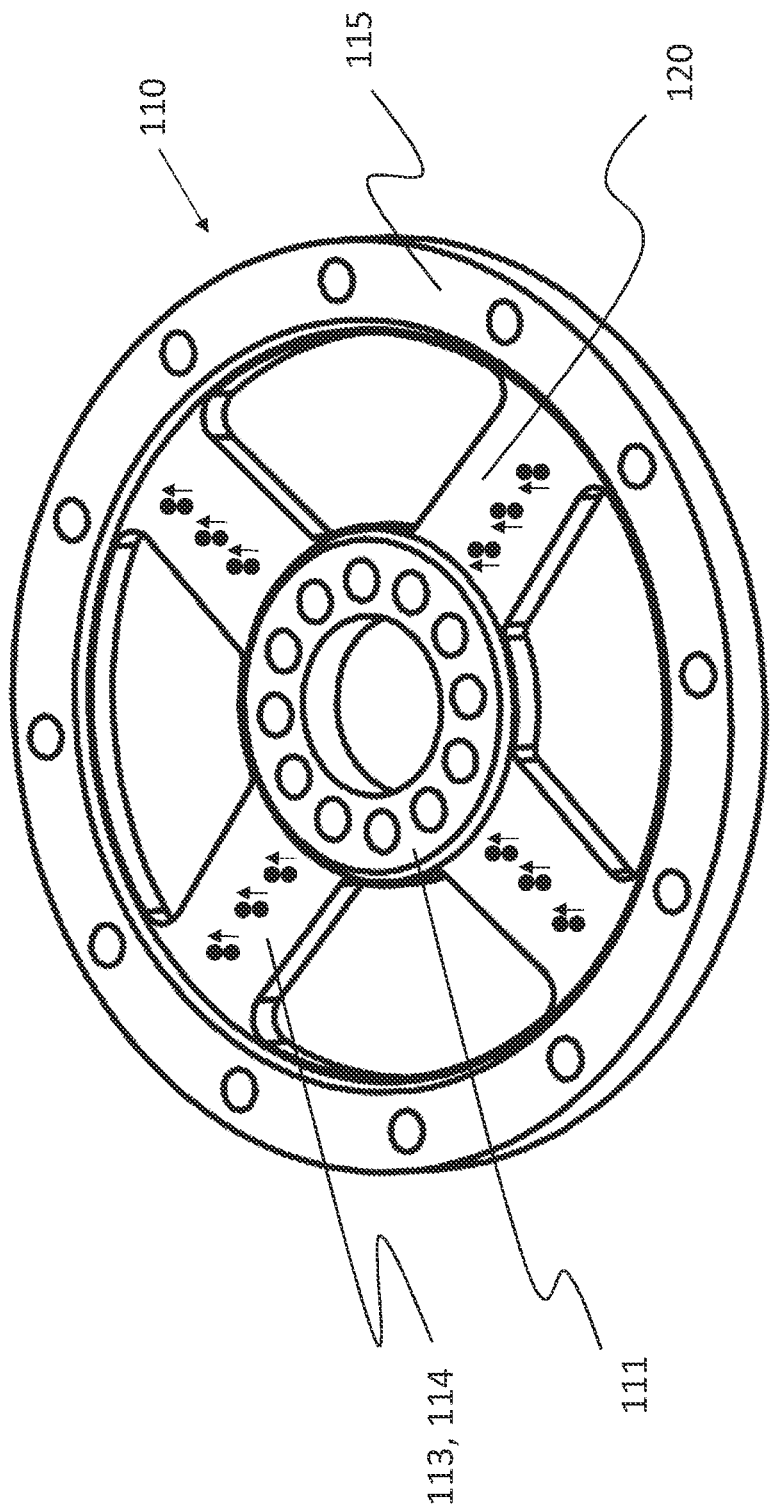

FIGS. 5A and 5B illustrate the contacting of the disk to generate permanent magnetization (biasing).

The method according to FIG. 5A for magnetizing a disk 110 comprising a magnetostrictive material is carried out as follows: conducting an electrical current from a connection region 113 or a connection element 114 (contact points e.g. on the center dashed line), which is provided between an inner region 111 which with respect to an axis of rotation is in proximity to the axis and an outer region 115 of disk 110 which is remote from the axis, to inner region 111 (contact points, e.g. on the inner dashed line) and/or outer region 115 (contact points, e.g. on the outer dashed line). The flow of current identified there by the parallel arrows generates a magnetic field identified by the curved arrows which is sufficiently strong to cause permanent magnetization of magnetostrictive material 120.

Additionally or alternatively, the electrical current can be conducted from a first side of the disk to an axially opposite second side of the disk, as illustrated in FIG. 5B. The double dots each represent a contact point from below and a contact point from above. The current there flows in the direction of the arrow through magnetostrictive material 120.

According to FIG. 5A, the disk is contacted in the connection region by one or more electrodes which is/are connected, for example, to the positive terminal of a voltage source. In this embodiment, the disk can furthermore be contacted both in the inner region as well as in the outer region by one or more electrodes which is/are connected, for example, to the negative terminal of the voltage source. The polarity can also be reversed.

Alternatively, the contact can also be established only in the inner region or the outer region. The electrodes of the voltage source (current generating device) contact the disk at contact points, for example, on one of the two sides of the disk.

In this case, the current can be introduced at one or more points of the disk, and the current can exit at one or more points of the disk.

According to the embodiment of FIG. 5B, the electrodes of the current generating device/voltage source contact the disk at contact points on oppositely disposed sides in pairs.

The current flow (or the voltage applied) can take place preferably in a pulsed manner. In this way, a very high current with a correspondingly high magnetic field can be generated (for a short period of time). The pulsed magnetization of shafts for use in magnetostrictive measurement technology for measuring torque is described, for example, in EP 1 774 271 B1 and EP 1 902 287 B1. This method is known as "Pulse Current Magnetic Encoding (PCME)".

The embodiments illustrated are only by way of example and the full scope of the present invention is defined by the claims.

What is claimed is:
1. A torque sensor, comprising:
   a disk comprising a magnetostrictive material that is magnetically biased or magnetizable; and
   a magnetic field sensor assembly, wherein:
   a torque acting about an axis of rotation of the disk can be applied to the disk and the magnetostrictive material is configured to generate a magnetic field outside the disk that changes dependent on the acting torque;

the magnetic field sensor assembly is configured to output a signal based on the magnetic field generated by the magnetostrictive material;

the torque sensor is configured to determine a value of the acting torque based on the signal that is output; and the magnetic field sensor assembly is arranged to be co-rotatable synchronously with the disk.

2. The torque sensor according to claim 1, further comprising:

a magnetization assembly for magnetizing the magnetostrictive material over a limited period of time so that the magnetic field, which changes dependent on the acting torque, can be generated outside the disk with the magnetostrictive material, and thus magnetized material.

3. The torque sensor according to claim 2, wherein the magnetization assembly is arranged to be co-rotatable synchronously with the disk or is arranged fixedly with respect to a direction of rotation predetermined by the axis of rotation.

4. The torque sensor according to claim 1, wherein the magnetic field sensor assembly comprises one or both of at least one electric coil and at least one AMR sensor.

5. The torque sensor according to claim 1, wherein the disk has an inner region in proximity to the axis and an outer region remote from the axis, the inner region and the outer region are connected by at least one connection region, and the at least one connection region comprises at least part of the magnetostrictive material.

6. The torque sensor according to claim 5, wherein the inner region, the outer region, and the at least one connection region are formed integrally.

7. The torque sensor according to claim 5, wherein the at least one connection region comprises one or more of connection elements, spokes and struts.

8. The torque sensor according to claim 5, wherein a driving force can be applied to the inner region, whereby the inner region acts as a driving region and the outer region acts as a driven region, or wherein a driving force can be applied to the outer region, whereby the outer region acts as a driving region and the inner region acts as a driven region.

9. The torque sensor according to claim 8, wherein the inner region comprises a first coupling device for coupling to a drive element and the outer region comprises a second coupling device for coupling to a driven element; or wherein the inner region comprises a first coupling device for coupling to a driven element and the outer region comprises a second coupling device for coupling to a drive element.

10. A drive bearing, comprising:

the torque sensor according to claim 1, wherein a chainring carrier or crank star of the drive bearing is formed as the disk of the torque sensor, where the magnetic field sensor assembly is provided in relation to a bottom bracket casing on an inner side or an outer side of the disk.

11. A method for measuring torque, comprising:

providing a disk which is rotatable about an axis of rotation, comprising a magnetically biased material or magnetizable magnetostrictive material;

applying a torque that acts about the axis of rotation to the disk;

generating a magnetic field outside the disk with the magnetizable magnetostrictive material, where the magnetic field generated varies dependent on an acting torque;

outputting a signal with a magnetic field sensor assembly based on the magnetic field generated; and determining a value of the acting torque based on the signal that is output;

wherein a following further step is performed in a case of the magnetizable magnetostrictive material prior to applying the torque acting about the axis of rotation to the disk: magnetizing the magnetizable magnetostrictive material for a limited period of time, and wherein the magnetic field sensor assembly is arranged to be co-rotatable synchronously with the disk.

12. A torque sensor comprising:

a disk comprising a magnetostrictive material that is magnetically biased or magnetizable;

a magnetic field sensor assembly, wherein:

a torque acting about an axis of rotation of the disk can be applied to the disk and the magnetostrictive material is configured to generate a magnetic field outside the disk that changes dependent on the acting torque;

the magnetic field sensor assembly is configured to output a signal based on the magnetic field generated by the magnetostrictive material;

the torque sensor is configured to determine a value of the acting torque based on the signal that is output; and a magnetization assembly for magnetizing the magnetostrictive material over a limited period of time so that the magnetic field, which changes dependent on the acting torque, can be generated outside the disk with the magnetostrictive material, thus magnetized material, wherein the magnetization assembly is arranged to be co-rotatable synchronously with the disk.

* * * * *